US009377846B2

(12) United States Patent
Cheong

(10) Patent No.: US 9,377,846 B2
(45) Date of Patent: Jun. 28, 2016

(54) SERIAL ADVANCED TECHNOLOGY ATTACHMENT INTERFACES AND METHODS FOR POWER MANAGEMENT THEREOF

(71) Applicant: Samsung Electronics Co., Ltd., Suwon-si, Gyeonggi-do (KR)

(72) Inventor: WooSeong Cheong, Suwon-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 0 days.

(21) Appl. No.: 14/460,788

(22) Filed: Aug. 15, 2014

(65) Prior Publication Data

US 2014/0359322 A1 Dec. 4, 2014

Related U.S. Application Data

(62) Division of application No. 13/354,602, filed on Jan. 20, 2012, now Pat. No. 8,819,462.

(30) Foreign Application Priority Data

Jan. 26, 2011 (KR) .................. 10-2011-0007848

(51) Int. Cl.
  *G06F 1/32* (2006.01)
  *G06F 1/00* (2006.01)
  (Continued)

(52) U.S. Cl.
  CPC .............. *G06F 1/3293* (2013.01); *G06F 1/266* (2013.01); *G06F 1/3253* (2013.01); *G06F 1/3256* (2013.01); *G06F 1/3268* (2013.01); *G06F 1/3281* (2013.01); *G06F 1/3296* (2013.01);
  (Continued)

(58) Field of Classification Search
  CPC ...................................... G06F 1/3203
  USPC ......................................... 713/320
  See application file for complete search history.

(56) References Cited

U.S. PATENT DOCUMENTS

| 5,675,614 A | * | 10/1997 | Wetters ......................... 375/351 |
| 5,805,401 A | | 9/1998 | Schuellein et al. |
| 6,021,500 A | | 2/2000 | Wang et al. |

(Continued)

FOREIGN PATENT DOCUMENTS

| CN | 1624633 A | 6/2005 |
| JP | 2005078514 A | 3/2005 |
| JP | 2005190202 A | 7/2005 |

OTHER PUBLICATIONS

Serial ATA International Organization: Serial ATA Revision 3.0, Jun. 2, 2009.

(Continued)

*Primary Examiner* — Suresh Suryawanshi
(74) *Attorney, Agent, or Firm* — Harness, Dickey & Pierce, P.L.C.

(57) ABSTRACT

At least one example embodiment discloses a method of managing a power between a host serial advanced technology attachment (SATA) interface and a device SATA interface. The method includes first requesting to enter one of power saving states, defined by a SATA protocol, and second requesting to enter a deep power saving state if one of the host SATA interface and the device SATA interface operates at the first requested power saving state. The first requesting to enter one of power saving states and the second requesting to enter a deep power saving state are performed by one of the host SATA interface and the device SATA interface.

39 Claims, 11 Drawing Sheets

(51) Int. Cl.
*H03K 5/22* (2006.01)
*G06F 1/26* (2006.01)

(52) U.S. Cl.
CPC ............ *Y02B60/125* (2013.01); *Y02B 60/1246* (2013.01); *Y02B 60/32* (2013.01)

(56) References Cited

U.S. PATENT DOCUMENTS

| | | |
|---|---|---|
| 6,778,006 B2 | 8/2004 | Lin |
| 7,254,732 B2 | 8/2007 | Bashford et al. |
| 7,328,356 B2 | 2/2008 | Igari |
| 7,393,247 B1 | 7/2008 | Yu et al. |
| 7,409,565 B2 | 8/2008 | Chotoku et al. |
| 7,424,628 B2 | 9/2008 | Matsumoto et al. |
| 7,475,265 B2 | 1/2009 | Oshikawa et al. |
| 7,770,041 B2 * | 8/2010 | Igari ............................ 713/320 |
| 7,856,567 B2 * | 12/2010 | Igari ............................ 713/320 |
| 8,024,589 B2 | 9/2011 | Okoge et al. |
| 8,051,314 B2 | 11/2011 | Huffman et al. |
| 8,138,803 B2 | 3/2012 | Ng et al. |
| 8,199,858 B2 | 6/2012 | Kurooka et al. |
| 8,200,998 B2 * | 6/2012 | Cheong et al. ................. 713/320 |
| 8,250,393 B2 | 8/2012 | Qin et al. |
| 8,275,560 B2 | 9/2012 | Radhakrishnan et al. |
| 8,443,221 B2 | 5/2013 | Kagan et al. |
| 8,504,850 B2 * | 8/2013 | Wu et al. ......................... 713/300 |
| 2003/0148801 A1 | 8/2003 | Deyring et al. |
| 2004/0268170 A1 | 12/2004 | Ayyavu et al. |
| 2005/0144490 A1 | 6/2005 | Igari |
| 2005/0235171 A1 | 10/2005 | Igari |
| 2008/0133951 A1 | 6/2008 | Igari |
| 2008/0184051 A1 | 7/2008 | Cheong et al. |
| 2009/0019301 A1 | 1/2009 | Minami |
| 2009/0083587 A1 | 3/2009 | Ng et al. |
| 2009/0187779 A1 | 7/2009 | Liu et al. |
| 2010/0169687 A1 | 7/2010 | Kimura |

OTHER PUBLICATIONS

Intel Advanced Boot Block Flash Memory (B3), Aug. 18, 2005.
InnoDisk CFast 100 Datasheet, InnoDisk Corp., pp. 1-51, Aug. 2010.
256Mb M-die MLC Nor Specification, Samsung Electronics, pp. 1-52, Apr. 2005.
CFast Specification Revision 1.1, Compact Flash Association, pp. 1-29, Nov. 3, 2010.

* cited by examiner

| OOB Pattern | T1 | T2 |
|---|---|---|
| COMWAKE | 106.7ns | 106.7ns |
| COMINIT/COMRESET | 106.7ns | 320ns |

Fig. 8

| Name | Index |
|---|---|
| P1 | 3.3V Power |
| P2 | 3.3V Power |
| P3 | 3.3V Power, Pre-charge |
| P4 | GND |
| P5 | GND |
| P6 | GND |
| P7 | 5V Power, Pre-charge |
| P8 | 5V Power |
| P9 | 5V Power |
| P10 | GND |
| P11 | Device Activity Signal, Staggered Spin-up Signal, Deep Slumber Signal |
| P12 | GND |
| P13 | 12V Power, Pre-charge |
| P14 | 12V Power |
| P15 | 12V Power |

SERIAL ADVANCED TECHNOLOGY ATTACHMENT INTERFACES AND METHODS FOR POWER MANAGEMENT THEREOF

CROSS-REFERENCE TO RELATED APPLICATIONS

This application is a divisional of and claims priority under 35 U.S.C. §§120, 121 to U.S. application Ser. No. 13/354,602, filed Jan. 20, 2012, which claims priority under 35 U.S.C. §119 to Korean Patent Application No. 10-2011-0007848 filed Jan. 26, 2011, the entire contents of each of which is hereby incorporated herein by reference.

BACKGROUND

1. Field

At least some example embodiments relate to serial advanced technology attachment (SATA) interfaces, and more particularly, relate to a power managing methods capable of reducing power consumption of the SATA interface.

2. Description of the Related Art

In computer systems, a host may be connected with peripheral devices (e.g., a data storage device, a printer, a scanner, and so on) through a standardized interface. The standardized interface may mean a protocol on a device used to connect the host and the peripheral devices, mechanical or electrical requirements, and command sets.

In computer systems, a standardized interface for interconnecting a host and a peripheral device may include various interfaces such as an advanced technology attachment (ATA) interface, a serial ATA, an external SATA (e-SATA), a small computer small interface (SCSI), a peripheral component interconnection (PCI) interface, a PCI express (PCI-E) interface, an IEEE 1394 interface, an universal serial bus (USB) interface, a secure digital (SD) card interface, a multi media card (MMC) interface, an embedded multi media card (eMMC) interface, a compact flash (CF) card interface, and so on.

Among the standardized interfaces, the ATA and SATA interfaces have been widely used at a personal computer or a handheld electronic device. The ATA interface may connect a host and a peripheral device via an ATA command set. Further, the ATA interface may use a parallel transfer manner where a plurality of signal lines is used. In case of the parallel transfer manner of the ATA interface, a skew or a crosstalk may arise due to the plurality of signal lines. The skew may mean that data signals simultaneously transferred via a plurality of signal lines from a transmission side arrive dispersedly at a receiver side. The crosstalk may mean that interference arises due to mutual induction caused between signals transferred via a plurality of signal lines.

The SATA interface may use a serial transfer manner. Accordingly, the SATA interface may connect a host and a peripheral device via an ATA command set using a serial transfer manner. The SATA can transfer signals in a high speed using a high clock frequency.

The SATA interface may support three power modes: a PHY ready (PHYRDY) power mode, a partial power mode, and a slumber power mode. During the PHYRDY power mode, it may operate at an active mode. During the partial and slumber power modes, it may operate at a power saving mode.

SUMMARY

At least one aspect of example embodiments of inventive concepts is directed to provide a method of managing a power between a host SATA interface and a device SATA interface, the method including first requesting to enter one of power saving states, defined by a SATA protocol, and second requesting to enter a deep power saving state if one of the host SATA interface and the device SATA interface operates at the requested power saving state. The first requesting to enter one of power saving states and the second requesting to enter a deep power saving state are performed by one of the host SATA interface and the device SATA interface.

In at least one example embodiment, the first requesting to enter one of power saving states includes requesting to enter one of a first power saving state and a second power saving state.

In at least one example embodiment, the first power saving state has a wake-up time shorter than a wake-up time of the second power saving state.

In at least one example embodiment, the first state is a partial state.

In at least one example embodiment, the second state is a slumber state.

In at least one example embodiment, the second power saving state has a wake-up time shorter than a wake-up time of the deep power saving state.

In at least one example embodiment, a power consumed by at least one of the host SATA interface and the device SATA interface in the deep power saving state is less than a power consumed at each of the power saving states.

In at least one example embodiment, the second requesting to enter a deep power saving state is executed by the SATA interface requesting to enter one of the power saving states.

In at least one example embodiment, the method further includes third requesting to enter a ready state while one of the host SATA interface and the device SATA interface operates at the first requested power saving state or the requested deep power saving state.

In at least one example embodiment, the third requesting to enter a ready state is executed by one of the host SATA interface and the device SATA interface.

At least another aspect of example embodiments of inventive concepts is directed to a serial advanced technology attachment (SATA) interface configured to receive a deep slumber signal. The SATA interface includes an out of band (OOB) signal detector configured to determine a type of an OOB signal, and a squelch circuit configured to detect a wake-up signal and detect whether received signals are the OOB signal according to a differential voltage between the received signals. A power is supplied only to the squelch circuit upon entering a deep slumber state based on the deep slumber signal, a power consumption of the SATA interface during deep slumber state being less than a power consumption of at least another power saving state.

In at least one example embodiment, the SATA interface further comprises a transmitter, a receiver, a phase locked loop circuit, and a voltage regulator, wherein upon entering the deep slumber state, no power is supplied to the transmitter, the receiver, the phase locked loop circuit, and the voltage regulator.

In at least one example embodiment, the deep slumber signal is received via a control signal line in a power cable.

In at least one example embodiment, the deep slumber signal is received via a deep slumber signal line physically separated from a SATA cable and a power cable.

In at least one example embodiment, the deep slumber signal is received via a data line of a SATA cable, the SATA interface further includes a deep signal detector configured to detect the deep slumber signal received through the data line, the deep slumber signal detector detecting two input signals received via the data line as the deep slumber signal if voltage levels of the two input signals are different from each other and the deep slumber signal if voltage levels of the two input signals are different from that of a common mode signal.

At least another example embodiment discloses serial advance technology attachment (SATA) interface configured to operate in a first power mode, the first power mode being a mode in which a single circuit of the SATA interface receives power. The SATA interface includes a squelch circuit configured to receive power in the first power mode.

BRIEF DESCRIPTION OF THE FIGURES

The above and other objects and features will become apparent from the following description with reference to the following figures, wherein like reference numerals refer to like parts throughout the various figures unless otherwise specified, and wherein

FIG. 8 is a diagram showing a configuration of a power cable of a SATA interface according to at least one example embodiment of inventive concepts.

DETAILED DESCRIPTION

Figure 1:
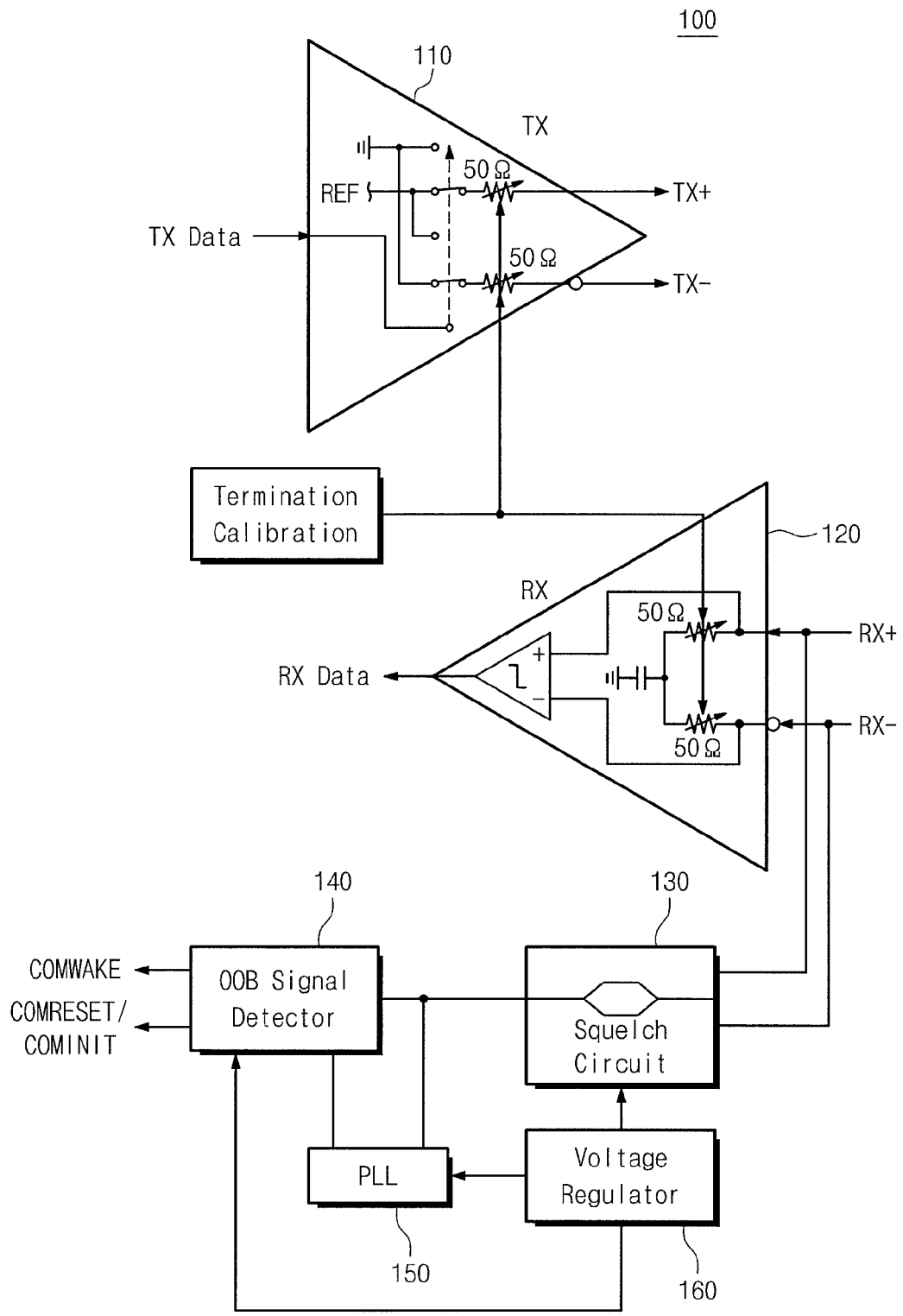
FIG. 1 is a block diagram of an analog front end (AFE) of a SATA interface according to at least one example embodiment.

Inventive concepts are described more fully hereinafter with reference to the accompanying drawings, in which example embodiments of inventive concepts are shown. Inventive concepts may, however, be embodied in many different forms and should not be construed as limited to the embodiments set forth herein. Rather, example embodiments are provided so that this disclosure will be thorough and complete, and will fully convey the scope of inventive concepts to those skilled in the art. In the drawings, the size and relative sizes of layers and regions may be exaggerated for clarity. Like numbers refer to like elements throughout.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of inventive concepts.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of inventive concepts. As used herein, the singular forms "a", "an" and "the" are intended to include the plural forms as well, unless the context clearly indicates otherwise. It will be further understood that the terms "including", "includes", "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a block diagram of an analog front end (AFE) of a SATA interface according to at least one example embodiment.

A SATA interface may be divided to a physical layer, a link layer, and a transport layer according to functionality.

The link and transport layers may form information data for transmitting data into packets and then may transfer them to the physical layer. The link and transport layers may extract information data from a signal transferred from the physical layer to send it to an application layer being an upper layer. The physical layer may convert packet data from the link layer into electrical signals to be sent to the outside in a high speed. Further, the physical layer may transfer a signal from the outside into the link layer. For this, the physical layer may be formed of analog circuits, and the link and transport layers may be formed of digital circuits.

The physical layer of the SATA interface, that is, an analog circuit may be classified into an analog front end (AFE). The AFE of the SATA interface may be formed of physical blocks (hereinafter, referred to as a PHY block) for converting an analog signal into a digital signal or a digital signal to an analog signal.

Referring to FIG. 1, the AFE 100 may include a transmitter 110, a receiver 120, a squelch circuit 130, and an OOB signal detector 140. The AFE 100 may further include a phase locked loop (PLL) circuit 150, a voltage regulator 160, and so on. The transmitter 110, the receiver 120, the PLL circuit 150, and the voltage regulator 160 may be well known, and description thereof is thus omitted.

The squelch circuit 130 may detect a common mode signal. The squelch circuit 130 may detect a voltage level of an input signal based on a predetermined threshold voltage. For example, if a differential voltage of an input signal is below 50 mV, the squelch circuit 130 may regard it as a common mode signal. In this case, the squelch circuit 130 may regard the input signal as a neutral state (e.g., a floating state). If a differential voltage of the input signal is over 200 mV, the squelch circuit 130 may regard it as a valid out of band (OOB) signal. The OOB detector 140 may judge a type of an OOB signal in response to an output signal of the squelch circuit 130.

As described above, the physical layer may be formed of analog circuits. Since the physical layer includes an AFE operating to detect an input signal, it may consume a large amount of power. Further, the physical layer may include analog circuits operating in a high speed. This means that a large amount of power is consumed by the physical layer. Accordingly, the SATA interface may have a plurality of power modes to manage power consumption of the SATA interface itself.

A protocol of the SATA interface according to at least one example embodiment of inventive concepts may define a partial and a slumber state for operating at a power saving mode. Besides, the protocol of the SATA interface according to at least one example embodiment of inventive concepts may define a deep slumber state for operating at a deep power saving mode.

If the SATA interface enters the deep slumber state, a power may be supplied only to a circuit block (e.g., a circuit of detecting a wake-up signal) among circuit blocks constituting the squelch circuit 130. Accordingly, the SATA interface may consume a power less at the deep slumber state as compared with a slumber state. A power state of the SATA interface according to at least one example embodiment of inventive concepts will be more fully described with reference to FIG. 2.

Figure 2:
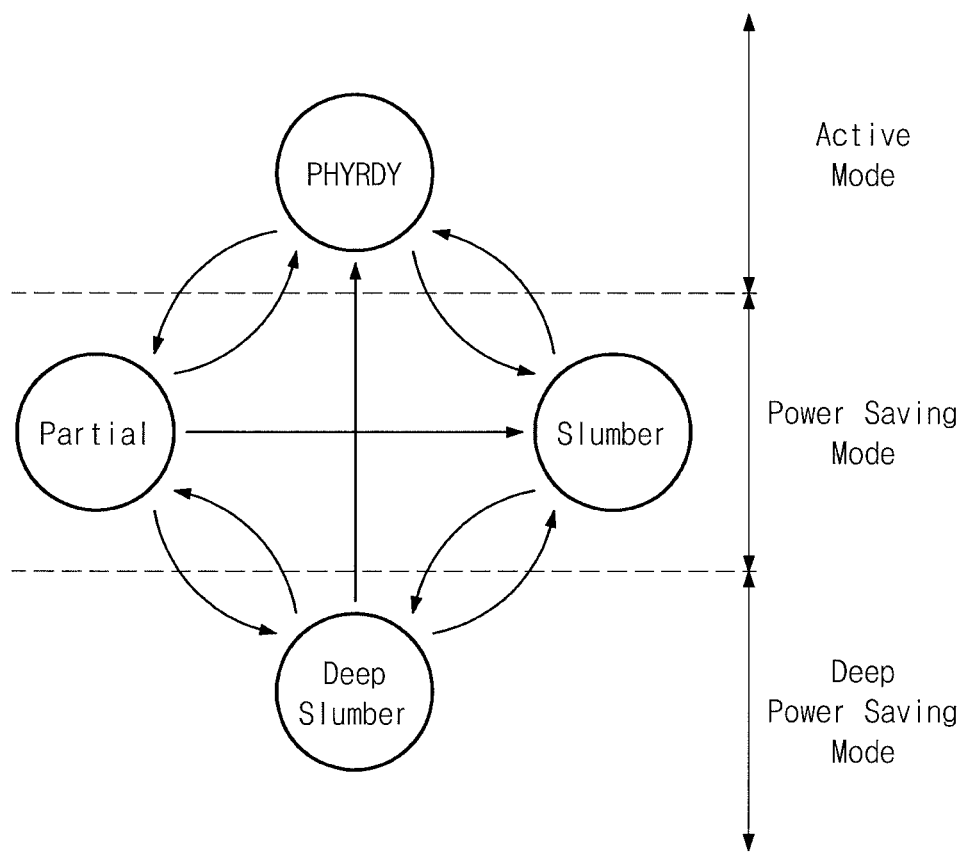
FIG. 2 is a diagram showing a power state of a SATA interface according to at least one example embodiment of inventive concepts.

FIG. 2 is a diagram showing a power state of a SATA interface according to an at least one example embodiment of inventive concepts.

Referring to FIG. 2, a protocol of a SATA interface may define a physical layer ready state (hereinafter, referred as to a PHYRDY state) for operating at an active mode. Further, the protocol of the SATA interface may define a partial and a slumber state for operating at a power saving mode. Further, the protocol of the SATA interface may define a deep slumber state for operating at a deep power saving mode.

The PHYRDY state may indicate that all PHY blocks of a physical layer are activated. The partial and slumber states may indicate a power saving state where the SATA interface does not operate substantially. That is, at the partial and slumber states, no power may be supplied to some PHY blocks of the physical layer.

The partial state and the slumber state may be differentiated according to a wake-up time taken to return to a PHYRDY state from a corresponding mode. For example, a wake-up time taken to return to the PHYRDY state from the partial state may be defined not to be over 10 μs. Unlike, a wake-up time taken to return to the PHYRDY state from the slumber state may be defined not to be over 10 ms. For this reason, no power may be supplied to PHY blocks associated with data transmitting and receiving at the partial state, while no power may be supplied to all PHY blocks other than a squelch circuit 130 in FIG. 1 at the slumber state. That is, a wake-up time of the partial state may be faster than that of the slumber state, and power consumption of the partial state may be less than that of the partial state.

The deep slumber state may represent a state that power is supplied to a partial circuit of the squelch circuit 130. Herein, the partial circuit may mean a little circuit for detecting a wake-up signal. Accordingly, power consumption of the deep slumber state may be less than that of the slumber state. Further, a wake-up time taken to return to the deep slumber state from the PHYRDY state may be longer than that taken to return to the slumber state from the PHYRDY state.

Among power states (or modes) of the above-described SATA interface, a PHYRDY state, a partial state, and a slumber state may be power sates defined by the SATA specification. According to at least one example embodiment of inventive concepts, a deep slumber state may be defined newly. It is possible to enter the partial state and the slumber state from the PHYRDY state. On the other hand, it is possible to enter the deep slumber state from the partial state and the slumber state. The deep slumber state may be a state which the SATA interface enters at a power saving mode. This means that a power can be saved more and more at the deep slumber state.

Figure 3:
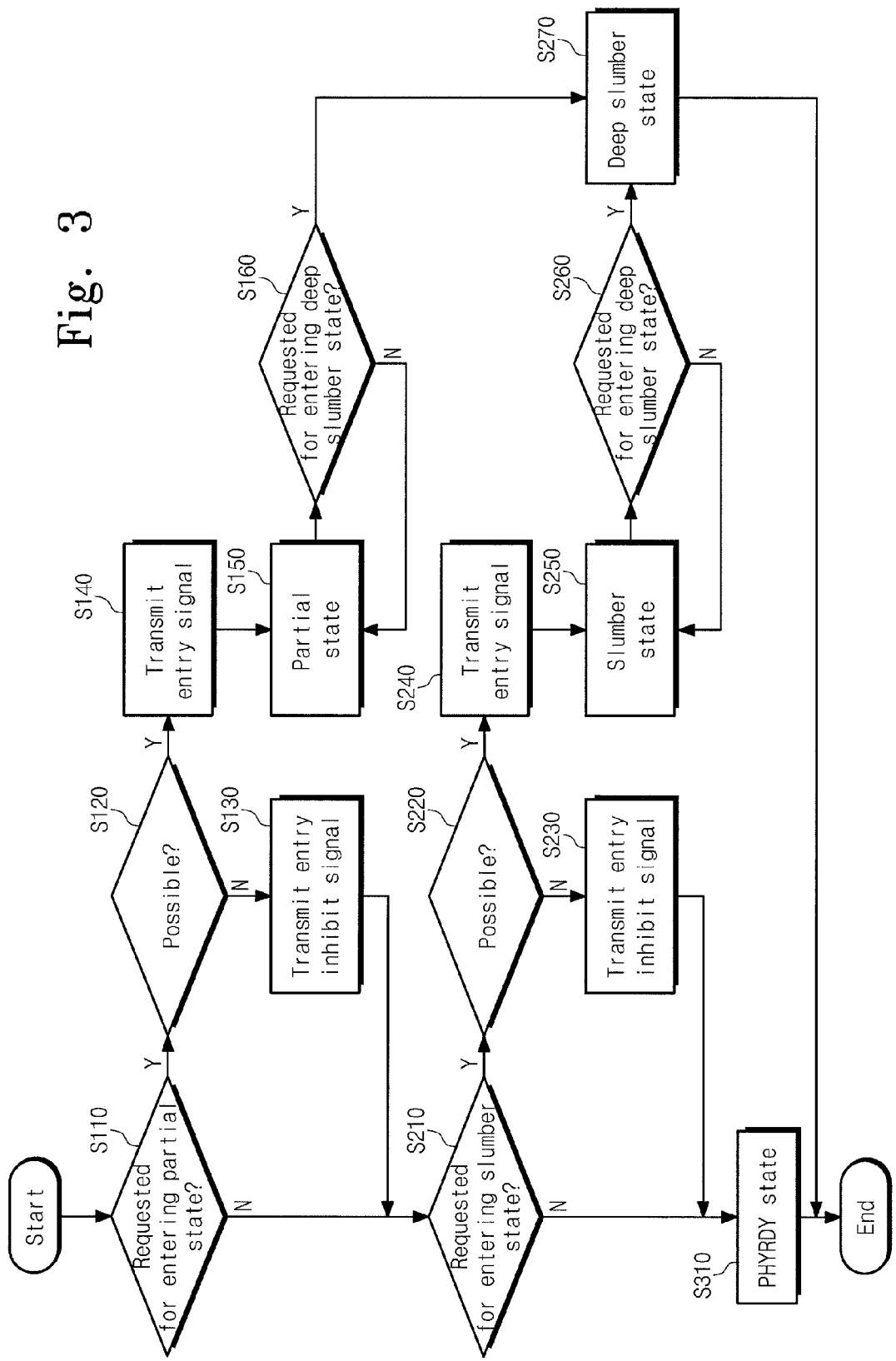
FIG. 3 is a flowchart of a power managing method of a SATA interface according to at least one example embodiment of inventive concepts.

FIG. 3 is a flowchart of a power managing method of a SATA interface according to at least one example embodiment of inventive concepts. In FIG. 3, a SATA interface requesting to enter any power state may be called a transmission SATA interface, and a SATA interface receiving the request may be called a receiving SATA interface.

In operation, the receiving SATA interface may check whether the transmission SATA interface requests entering a partial state. If so, the method proceeds to operation S120, in which the receiving SATA interface may judge whether entering the partial state is possible.

If the entering the partial state is judged to be not possible, the method proceeds to operation S130, in which the receiving SATA interface sends an entry inhibit signal to the transmission SATA interface. On the other hand, if the entering the partial state is judged to be possible, the method proceeds to operation 5140, in which the receiving SATA interface sends an entry signal to the transmission SATA interface. In operation S150, the transmission SATA interface may enter the partial state in response to the entry signal. Likewise, the receiving SATA interface may enter the partial state.

After entering the partial state, in operation S160, the receiving SATA interface may check whether the transmission SATA interface requests entering a deep slumber state. If not, the method proceeds to operation S150, in which the receiving SATA interface and the transmission SATA interface may maintain the partial state. On the other hand, in the event that the transmission SATA interface requests entering a deep slumber state, the method proceeds to operation 5270, in which the receiving SATA interface and the transmission SATA interface may enter the deep slumber state.

Returning to operation S110, if entering the partial state from is not requested from the transmission SATA interface, the method proceeds to operation 5210, in which the receiving SATA interface may check whether the transmission SATA interface requests entering a slumber state. If so, in operation 5220, the receiving SATA interface may judge whether entering the slumber state is possible.

If entering the slumber state is not possible, the method proceeds to operation 5230, in which the receiving SATA interface sends an entry inhibit signal to the transmission SATA interface. On the other hand, if entering the slumber state is possible, in operation S240, the receiving SATA interface may send an entry signal to the transmission SATA interface. In operation 5250, the transmission SATA interface may enter the slumber state in response to the entry signal, and the receiving SATA interfaces may also enter the slumber state.

After entering the slumber state, in operation 5260, the receiving SATA interface may check whether the transmission SATA interface requests entering a deep slumber state. If not, the method proceeds to operation 5250, in which the receiving SATA interface and the transmission SATA interface may maintain the slumber state. On the other hand, in the event that the transmission SATA interface requests entering a deep slumber state, the method proceeds to operation 5270, in which the receiving SATA interface and the transmission SATA interface may enter the deep slumber state.

Returning to operation 5210, if entering a slumber state is not requested, the method proceeds to operation 5310, in which the transmission and receiving SATA interfaces may maintain the PHYRDY state.

Figure 4:
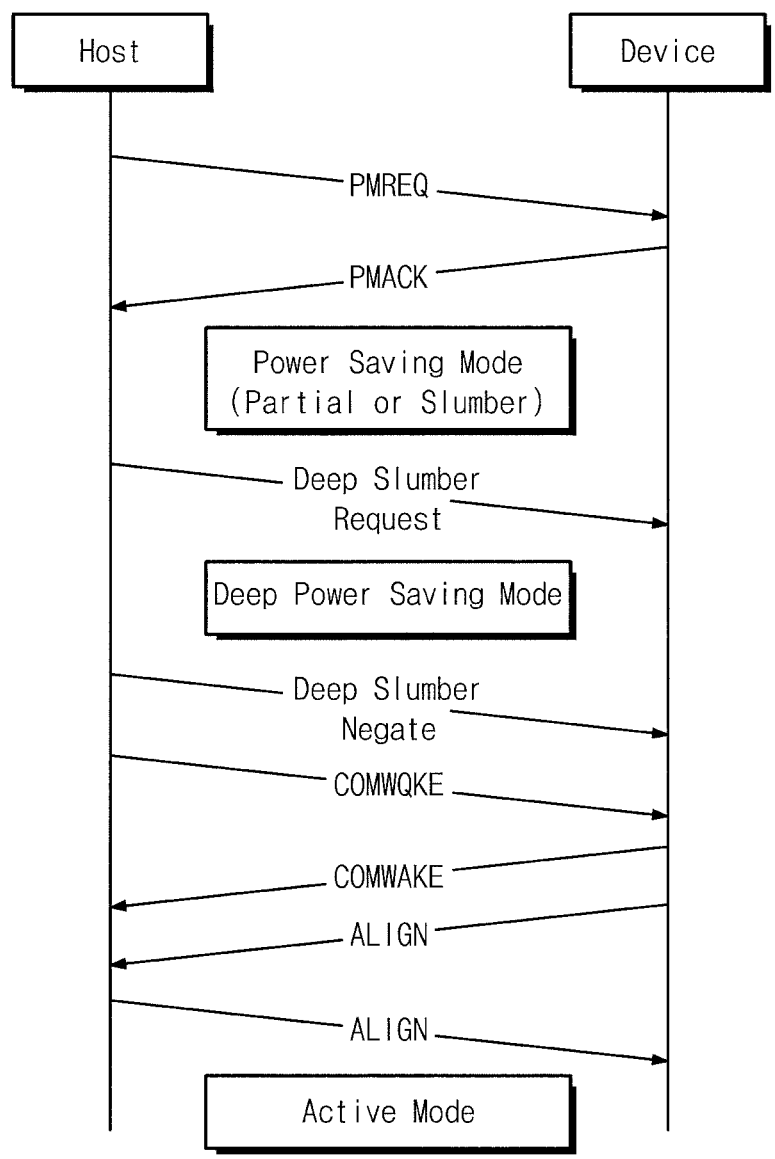
FIG. 4 is a flowchart showing a switching procedure from a power saving mode to an active mode in a power managing method of a SATA interface according to at least one example embodiment of inventive concepts.

FIG. 4 is a flowchart showing a switching procedure from a power saving mode to an active mode in a power managing method of a SATA interface according to at least one example embodiment of inventive concepts. The SATA interface may support an initiate power management (IPM) function as a power managing method. The IPM function may be divided into host initiate power management (HIPM) and device initiate power management (DIPM). The HIPM may represent the case where power states of a host-side SATA interface and a device-side SATA interface are changed upon a request of a SATA interface included in a host. The DIPM may represent the case where power states of a host-side SATA interface and a device-side SATA interface are changed upon a request of a SATA interface included in a device. For example, in FIG. 4, there is illustrated the case where a power state of a SATA interface is changed using the HIPM.

A host-side SATA interface wanting to operate at a power saving mode may send a power saving mode request signal to a device-side SATA interface. In the SATA interface specification, two types of power saving mode request signals PMREQ_P and PMREQ_S indicating a partial state and a slumber state may be defined. In FIG. 4, the power saving mode request signal may be represented by PMREQ. The device-side SATA interface receiving a PMREQ signal may send a response signal to the host-side SATA interface. In the SATA specification, the response signal may be defined to be a PMACK signal indicating that entering a power saving mode is possible.

By this procedure, the host-side SATA interface and the device-side SATA interface may operate at a power saving mode. That is, the host-side and device-side SATA interfaces may maintain any one of the partial state and the slumber state.

During the power saving mode, the host-side SATA interface requesting an operation of the power saving mode may send a request signal for entering a deep slumber state. According to the request signal, the host-side SATA interface and the device-side SATA interface may operate at a deep power saving mode. That is, the host-side and device-side SATA interfaces may maintain the deep slumber state.

During the deep power saving mode, a SATA interface wanting to operate at an active mode may send a request signal for getting out of the deep slumber state. FIG. 4 illustrates an example where the host-side SATA interface sends a request signal for getting out of the deep slumber state (Deep Slumber Negate). The device-side SATA interface may also send another signal COMWQKE. A SATA interface receiving the request signal for getting out of the deep slumber state may transmit an OOB signal for operating at an active mode. For example, in FIG. 4, the host-side SATA interface sends the OOB signal (a COMWAKE signal and an ALIGN signal) for operating at the active mode. Herein, the OOB signal will be described with reference to FIGS. 5 and 6. By this procedure, the host-side and device-side SATA interfaces may operate at the active mode.

Figures 5, 6:
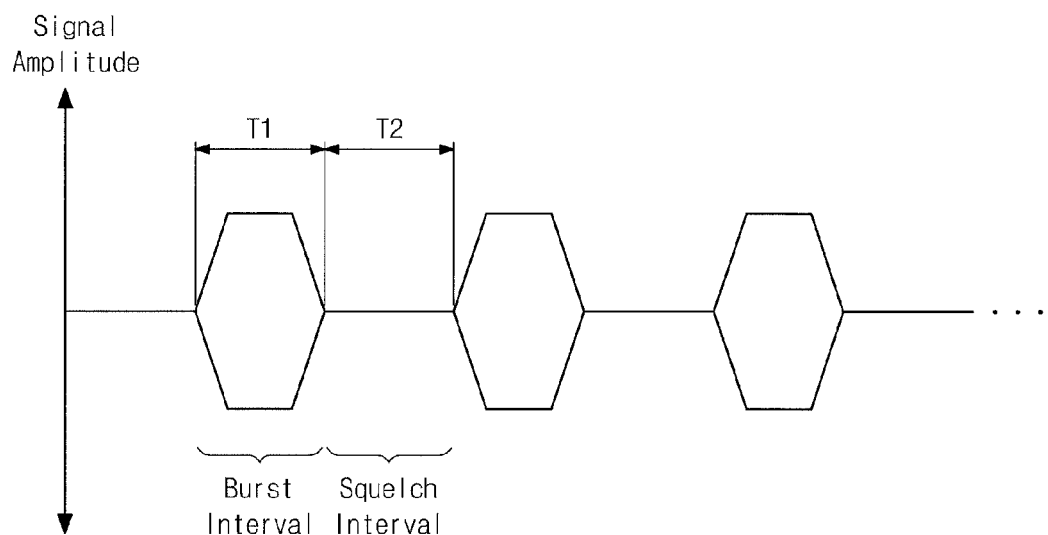
FIG. 5 is a diagram showing an OOB signal transferred for switching into an active mode according to at least one example embodiment.
FIG. 6 is a table showing time standards of burst and squelch intervals in FIG. 5 according to at least one example embodiment.

FIG. 5 is a diagram showing an OOB signal transferred for switching into an active mode.

A SATA interface may make OOB signaling to form a communication link between SATA interfaces. The OOB signaling may be executed at an initial connection operation (e.g., a power on sequence operation) and a return operation from a power saving mode, for example. The OOB signaling may use a signal divided into a squelch interval and a burst signal interval, instead of a signal having a transfer speed of 1.5 Gbps, 3.0 Gbps, or 6.0 Gbps. FIG. 5 shows such an OOB pattern that a burst interval T1 and a squelch interval T2 are repeated in turn. Herein, a differential signal may have a large amplitude during the burst interval T1, while it may have a small amplitude (i.e., almost close to '0') during the squelch interval T2.

FIG. 6 is a table showing time standards of burst and squelch intervals in FIG. 5. An OOB pattern may have three patterns: COMWAKE, COMINIT and COMRESET.

In the event that a host-side or device-side SATA interface requests wake-up of a device-side or host-side SATA interface, it may send a COMWAKE pattern. If a host-side or device-side SATA interface requests hardware reset, it may send a COMRESET pattern. When a device-side SATA interface requests communication initiation of a host-side SATA interface, it may send a COMINIT pattern. The COMINIT and COMRESET patterns may be signals electrically similar to each other.

Referring to FIG. 6, in case of the COMWAKE pattern, a burst interval T1 and a squelch interval T2 may be set to a time of 106.7 ns. In case of the COMINIT and COMRESET patterns, the burst interval T1 may be set to a time of 106.7 ns, and the squelch interval T2 may be set to a time of 320 ns. These times may be determined according to the provision of the SATA specification.

Figure 7:
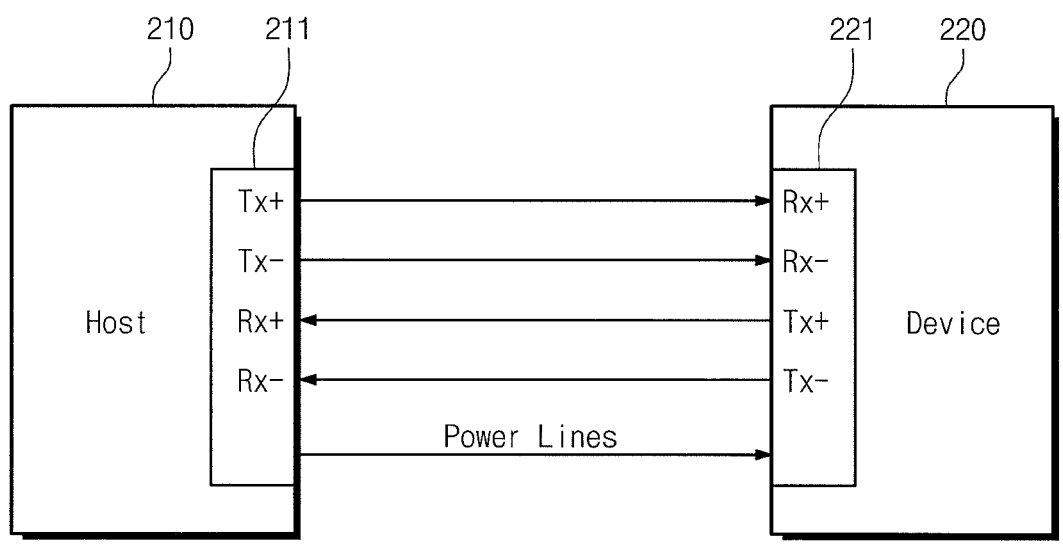
FIG. 7 is a diagram showing interconnection between a host and a device each including a SATA interface according to at least one example embodiment.

FIG. 7 is a diagram showing interconnection between a host and a device each including a SATA interface.

A host 210 including a SATA interface 211 may be an electronic device such as a computer system (e.g., a desktop computer, a laptop computer, a server, or the like), a handheld electronic device (e.g., a digital camera, a digital camcorder, a mobile phone, or the like), a television, or a navigation system. A device 220 including a SATA interface 221 may be a data storage device such as a hard disk drive, a solid state drive, an optical drive, or the like. The SATA interfaces 211 and 221 may be the same as the SATA interface shown in FIG. 1.

The host-side SATA interface 211 and the device-side SATA interface 221 may be interconnected by a SATA cable which is formed of two pairs of unidirectional data lines for transferring a differential signal (formed of positive and negative). Additionally, the host-side SATA interface 211 and the device-side SATA interface 221 may be interconnected by a power cable which is formed of power lines for supplying a plurality of powers and a signal line for transferring a control signal. The power cable will be more fully described with reference to FIG. 8.

FIG. 8 is a diagram showing a configuration of a power cable of a SATA interface according to at least one example embodiment of inventive concepts. Referring to FIG. 8, a power cable of a SATA interface may be formed of power lines for supplying power and a signal line for transferring a control signal.

The power lines may be represented by symbols P1 to P10 and P12 to P15, respectively. The power lines P1 to P10 and P12 to P15 may be assigned to supply a 3.3V DC voltage, a 5V DC voltage, a 12V DC voltage, and a ground voltage. The signal line for transferring a control signal may be represented by a symbol P11. The signal line P11 may transfer any one of a device activity signal, a staggered spin-up signal, and a deep slumber signal.

Among signals transferred via the signal line P11, the device activity signal and the staggered spin-up signal may be signals currently defined by the SATA specification. A deep slumber signal may be newly added as a signal transferred via the signal line P11.

The device activity signal may be activated when data is sent to the device-side SATA interface from the host-side SATA interface. The staggered spin-up signal may be a control signal for spinning up devices stepwise when a plurality of device-side SATA interfaces are connected with the host-side SATA interface and a device is a hard disk drive. Thus, the staggered spin-up signal may be activated at initial power-up. The deep slumber signal may be activated when entering a deep slumber state is requested while host-side and device-side SATA interfaces operate at a power saving mode.

Accordingly, since activation points of time of the device activity signal, the staggered spin-up signal, and the deep slumber signal are different from one another, it is possible to transfer them via one signal line P11.

Figure 9:
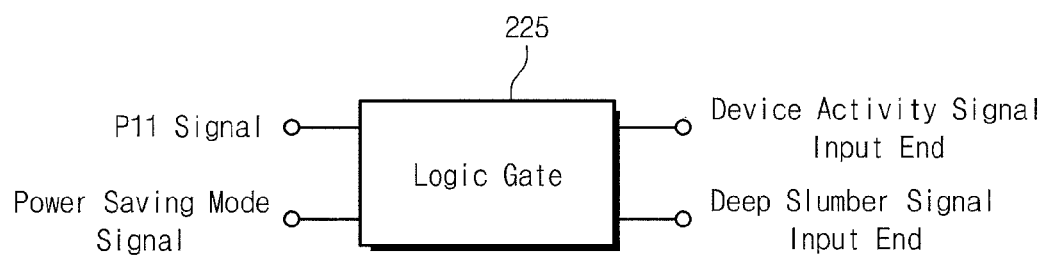
FIG. 9 is a diagram for describing a deep slumber signal receiving method according to at least one example embodiment of inventive concepts.

FIG. 9 is a diagram for describing a deep slumber signal receiving method according to the example of FIG. 8.

As described above, a deep slumber signal transferred via a signal line P11 may be activated while host-side and device-side SATA interfaces operate at a power saving mode. Since data is not transferred during the power saving mode, a device activity signal is not activated. Accordingly, a physical layer of a device-side SATA interface may include a logic gate 225 which makes the device activity signal be inactivated during the power saving mode.

The logic gate 225 may receive a power saving mode signal indicating a power saving mode of operation and a signal transferred via a signal line P11. During the power saving mode, the logic gate 225 may transfer the signal provided via the signal line P11 into a deep slumber signal input end. When a current mode is not the power saving mode, the logic gate 225 may transfer the signal provided via the signal line P11 into a device activity signal input end. That is, the logic gate 225 may be switch logic. Alternatively, the logic gate 225 may be a logic circuit which is configured to operate the same as above described.

Figure 10:
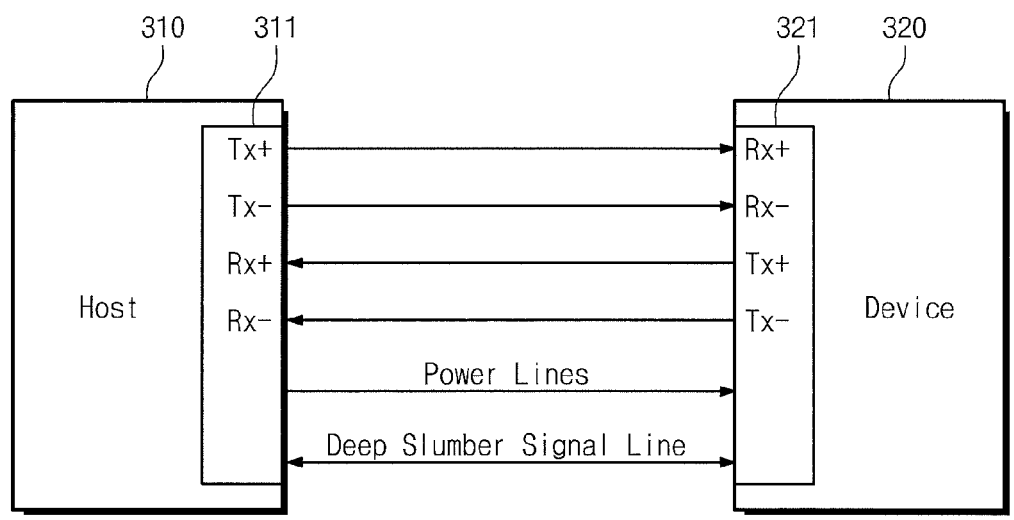
FIG. 10 is a diagram for describing a signal line for transmitting and receiving a deep slumber signal according to at least one example embodiment of inventive concepts.

FIG. 10 is a diagram for describing a signal line for transmitting and receiving a deep slumber signal according to at least one example embodiment of inventive concepts.

Referring to FIG. 10, a host 310 includes a SATA interface 311 and a device 320 includes a SATA interface 321. The host-side SATA interface 311 and the device-side SATA interface 321 may be interconnected by a SATA cable which is formed of two pairs of unidirectional data lines for transferring a differential signal (formed of positive and negative). The host-side and device-side SATA interfaces 311 and 321 may be interconnected by a power cable which is formed of power lines for supplying power and a signal line. The SATA interfaces 311 and 321 may be the same as the SATA interface shown in FIG. 1.

As described in FIG. 8, a deep slumber signal for requesting entering a deep slumber state is transferred via a signal line included in a power cable. In accordance with FIG. 10, the deep slumber signal may be transferred via a bi-directional signal line separately assigned for transferring the deep slumber signal.

Figure 11:
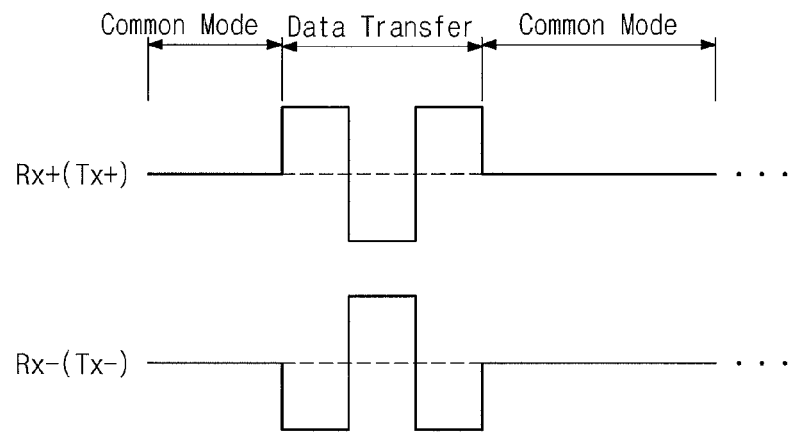
FIG. 11 is a diagram for describing a differential signal transferring method of a SATA interface according to at least one example embodiment.

FIG. 11 is a diagram for describing a differential signal transferring method of a SATA interface.

In a SATA interface, data may be transferred by a low voltage differential signaling (LVDS) manner. With the LVDS manner, a data value may be expressed by a difference between two signals (e.g., Rx+ and Rx− signals or Tx+ and Tx− signals) transferred via data lines. Since the LVDS manner uses a signal having a small amplitude, a switching speed of a data value may be fast, and power consumption may be reduced.

As illustrated in FIG. 11, in case of the LVDS manner, two signals may maintain a neutral logic state (e.g., a floating state) within an interval where data is not transferred. That is, when data is not transferred, two signals may have a common mode voltage level, respectively.

Figure 12:
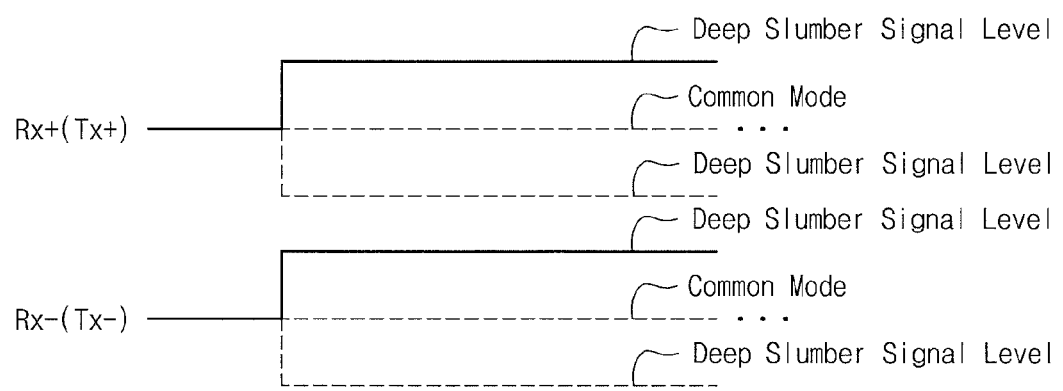
FIG. 12 is a diagram for describing a method of transmitting and receiving a deep slumber signal according to at least one example embodiment of inventive concepts.

FIG. 12 is a diagram for describing a method of transmitting and receiving a deep slumber signal according to at least one example embodiment of inventive concepts.

As described above, in the LVDS manner, two signals may have a common mode voltage level when data is not transferred. This means that two signals have a common mode voltage level when a SATA interface operates at a power saving mode.

A deep slumber signal may be sent via a data line during a power saving mode of the SATA interface. For example, the deep slumber signal may be a signal having the same voltage level, not a differential signal. That is, the deep slumber signal may have a voltage level higher (or, lower) than a common mode voltage level.

Figure 13:
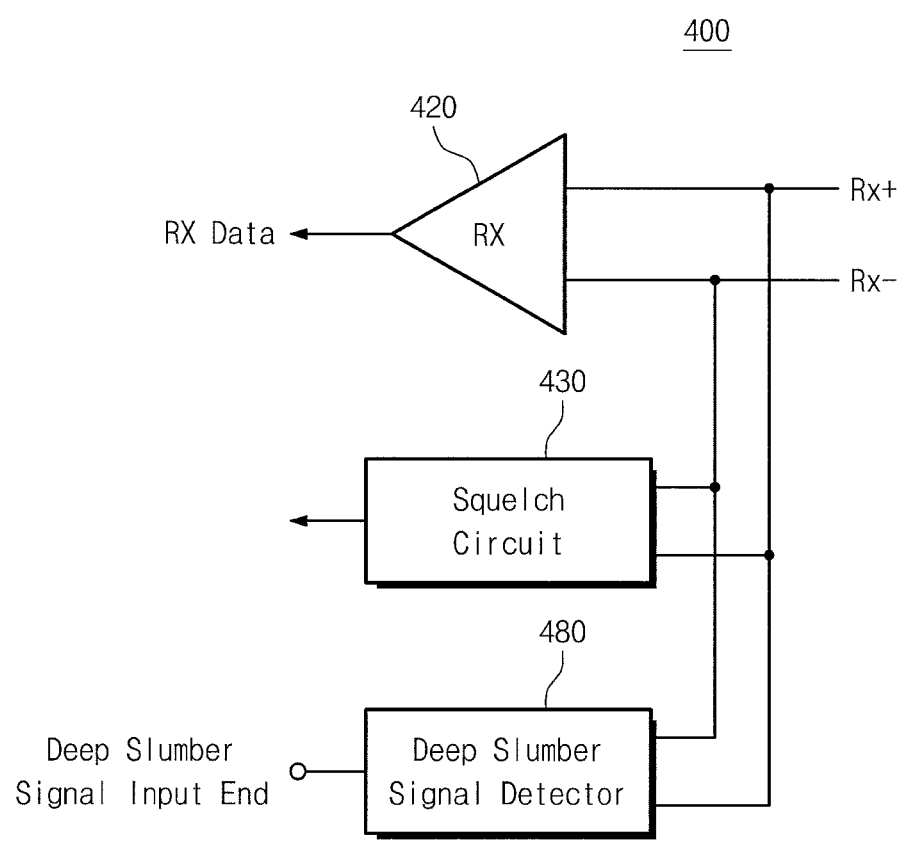
FIG. 13 is a block diagram of a circuit of receiving a deep slumber signal according to at least one example embodiment of inventive concepts.

FIG. 13 is a block diagram of a circuit of receiving a deep slumber signal according to the example embodiment of FIGS. 11 and 12. Referring to FIG. 13, an analog front end 400 of a SATA interface according to the example embodiment of FIGS. 11 and 12 may include a receiver 420, a squelch circuit 430, and a deep slumber signal detector 480. The analog front end 400 of the SATA interface may further include a transmitter, an 00B signal detector, a PLL circuit, a voltage regulator, as described in FIG. 1.

As described in FIG. 12, if a deep slumber signal is transferred via a data line while a SATA interface operates at a power saving mode, a detector circuit may be used to detect the deep slumber signal. The analog front end 400 of the SATA interface may include a deep slumber signal detector 480 which is configured to detect a deep slumber signal transferred via data lines Rx+ and Rx−.

The deep slumber signal detector 480 may be activated when a SATA interface operates at a power saving mode. The deep slumber signal detector 480 may transfer a control signal to a deep slumber signal input end when signals transferred via data lines RX+ and Rx− have the same voltage level higher (or, lower) than a common mode voltage level.

Figure 14:
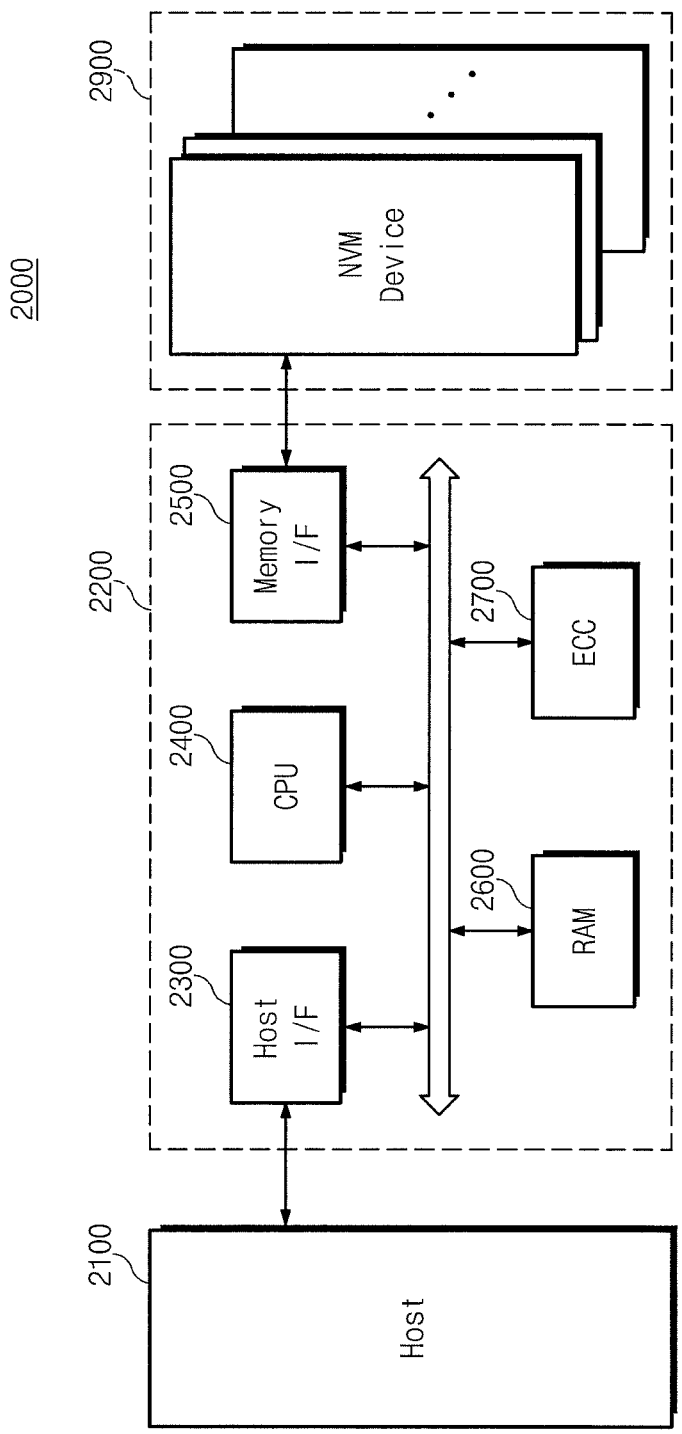
FIG. 14 is a block diagram of a user device including a SATA interface according to at least one example embodiment of inventive concepts.

FIG. 14 is a block diagram of a user device including a SATA interface according to at least one example embodiment of inventive concepts.

Referring to FIG. 14, a memory system 2000 may include a memory controller 2200 and at least one non-volatile memory device 2900.

The memory controller 2200 may be connected to the host 2100 and the non-volatile memory device 2900. The memory controller 2200 may respond to a request of the host 2100 to access the non-volatile memory device 2900. For example, the memory controller 2200 may be configured to control read, write and erase operations of the non-volatile memory device 2900. The memory controller 2200 may be configured to provide an interface between the non-volatile memory device 2900 and the host 2100. The memory controller 2200 may be configured to drive firmware for controlling the non-volatile memory device 2900.

The memory controller 2200 may include constituent elements such as a RAM 2600, a CPU 2400, a host interface 2300, an ECC block 2700, and a memory interface 2500. The RAM 2600 may be used as a working memory of the CPU 2400. The CPU 2400 may control an overall operation of the memory controller 2200.

The host interface 2300 may be a SATA interface according to at least one example embodiment of inventive concepts. The host 2100 and the memory controller 2200 may be connected via the SATA interface 2300. The SATA interface 2300 may be configured such that a power is supplied only to a partial circuit block (e.g., a circuit detecting a wake-up signal) of circuit blocks constituting a squelch circuit when it enters a deep slumber state. Accordingly, it is possible to reduce a power consumed by the SATA interface 2300 at a deep slumber state.

The ECC block 2700 may be configured to detect an error of data read out from the non-volatile memory device 2900 and to correct the detected error. The ECC block 2700 may be provided as a constituent element of the memory controller 2200. In another example embodiment, the ECC block 2700 may be provided as a constituent element of the non-volatile memory device 2900. The memory interface 2500 may provide an interface between the non-volatile memory device 2900 and the memory controller 2200.

It is well understood that the memory controller 2200 is not limited to this disclosure. For example, the memory controller 2200 may further include a ROM which stores code data needed for an initial booting operation and data for interfacing with the host 2100.

The memory controller 2200 and the non-volatile memory device 2900 may be integrated in single semiconductor device to form a memory card such as a PCMCIA (personal computer memory card international association) card, a CF (compact flash) card, a smart media card, a memory stick, a multi media card (MMC, RS-MMC, MMC-micro), an SD card (SD, Mini-SD, Micro-SD, SDHC), UFS (universal flash storage), and so on.

In at least some example embodiments, the memory controller 2200 and the non-volatile memory device 2900 may be applied to a solid state drive (SSD), computer, portable computer, Ultra Mobile PC (UMPC), workstation, net-book, PDA, web tablet, wireless phone, mobile phone, smart phone, e-book, PMP (portable multimedia player), digital camera, digital audio recorder/player, digital picture/video recorder/player, portable game machine, navigation system, black box, 3-dimensional television, a device capable of transmitting and receiving information at a wireless circumstance, one of various electronic devices constituting home network, one of various electronic devices constituting computer network, one of various electronic devices constituting telematics network, RFID, an embedded system, or one of various electronic devices constituting computing system.

In at least some example embodiments, the non-volatile memory device 2900 or the memory controller 2200 may be packed using packages such as PoP (Package on Package), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), Wafer-Level Processed Stack Package (WSP), and the like.

The above-disclosed subject matter is to be considered illustrative, and not restrictive, and the appended claims are intended to cover all such modifications, enhancements, and other embodiments, which fall within the true spirit and scope. Thus, to the maximum extent allowed by law, the scope is to be determined by the broadest permissible interpretation of the following claims and their equivalents, and shall not be restricted or limited by the foregoing detailed description.

What is claimed is:

1. A serial advanced technology attachment (SATA) interface circuit comprising:
a receiver configured to receive first differential signals from an external device through signal lines; and
at least one power segment configured to receive power from the external device, the at least one power segment configured to receive a deep sleep signal from the external drive through a power segment line of the power segment, the power segment line being different than the signal lines, wherein
the SATA interface circuit is configured to enter one of a first sleep mode and a second sleep mode based on the first differential signals,
the SATA interface circuit is configured to detect an activation of the deep sleep signal and enter a third sleep mode in response to the activation of the deep sleep signal,
the SATA interface circuit is configured to consume less power in the third sleep mode than in the second sleep mode,
the SATA interface circuit is configured to consume less power in the second sleep mode than in the first sleep mode, and the SATA interface circuit is configured to enter the third sleep mode from the first sleep mode in response to the activation of the deep sleep signal.

2. The SATA interface circuit of claim 1, wherein the SATA interface circuit includes a device analog front end.

3. The SATA interface circuit of claim 1, wherein the SATA interface circuit is configured to enter the third sleep mode directly from the first sleep mode in response to the activation of the deep sleep signal.

4. The SATA interface circuit of claim 1, wherein the SATA interface circuit is configured to enter an active mode from at least the third sleep mode and the first sleep mode, a time period to enter the active mode from the third sleep mode being greater than a time period to enter the active mode from the first sleep mode.

5. The SATA interface circuit of claim 1, wherein the SATA interface circuit is configured to exit the third sleep mode in response to a deactivation of the signal received through the power segment if the interface circuit is in the third sleep mode.

6. The SATA interface circuit of claim 5, wherein the SATA interface circuit is configured to enter the first sleep mode if the interface circuit exits the third sleep mode.

7. The SATA interface circuit of claim 5, wherein the SATA interface circuit is configured to enter an active mode in response to an out of band (OOB) signal received after the interface exits the third sleep mode.

8. The SATA interface circuit of claim 1, wherein the SATA interface circuit comprises:
a squelch circuit configured to receive the first differential signals and determine whether the first differential signals form one of a common mode signal and an out of band (OOB) signal;
an OOB signal detector configured to receive the first differential signals and decode the first differential signals if the first differential signals form the OOB signal; and
a receiving circuit configured to receive the deep sleep signal and determine whether the deep sleep signal is activated or deactivated.

9. A method of managing a power of an Serial Advanced Technology Attachment (SATA) interface circuit, the method comprising:
receiving, by a receiver, a request from an external device through the SATA interface circuit, the request being a differential signal;
entering one of a first sleep mode and a second sleep mode of the SATA interface circuit in response to the request;
receiving a deep sleep signal from the external device through the SATA interface circuit;
detecting an activation of the deep sleep signal; and
entering a third sleep mode of the SATA interface circuit upon detecting the activation of the deep sleep signal,
wherein a power consumed by the SATA interface circuit in the third sleep mode is less than a power consumed by the SATA interface circuit in the second sleep mode,
the power consumed by the SATA interface circuit in the second sleep mode is less than a power consumed by the SATA interface circuit in the first sleep mode,
the SATA interface circuit is configured to enter the third sleep mode from the first sleep mode, and
the SATA interface circuit is configured to receive the deep sleep signal, the deep sleep signal not being received through the receiver.

10. The method of claim 9, further comprising:
detecting an out of band (OOB) signal after entering the first sleep mode; and
entering an active mode of the SATA interface circuit upon detecting the OOB signal.

11. The method of claim 9, further comprising:
detecting a deactivation of the deep sleep signal after entering the third sleep mode;
detecting an out of band (OOB) signal received after detecting the deactivation of the; and
entering an active mode of the SATA interface circuit upon detecting the OOB signal.

12. A storage device comprising:
a nonvolatile memory;
a memory controller configured to control the nonvolatile memory, the memory controller including an interface circuit configured to communicate with an external device,
the interface circuit including,
a receiver configured to receive first differential signals from the external device; and
a transmitter configured to transmit second differential signals to the external device, wherein
the interface circuit is configured to receive a deep sleep signal from the external device,
the interface circuit is configured to enter one of a first sleep mode and a second sleep mode based on the first differential signals,
the interface circuit is configured to enter a third sleep mode from the first sleep mode in response to an activation of the deep sleep signal,
the interface circuit is configured to enter the third sleep mode from the second sleep mode in response to the activation of the deep sleep signal,
the interface circuit is configured to consume less power in the third sleep mode than in the second sleep mode,
the interface circuit is configured to consume less power in the second sleep mode than in the first sleep mode, and
the interface circuit is configured to receive the deep sleep signal, the deep sleep signal being not received through the receiver.

13. The storage device of claim 12, the interface circuit is configured to enter an active mode from at least the third sleep mode and the first sleep mode, a time period to enter the active mode from the third sleep mode being greater than a time period to enter the active mode from the first sleep mode.

14. The storage device of claim 12, wherein the interface circuit is configured to enter an active mode in response to an out of band (OOB) signal received through the receiver if the interface circuit is in the first sleep mode.

15. The storage device of claim 12, wherein the interface circuit is configured to determine that the first differential signals form a common mode signal if a difference between the first differential signals is less than a first voltage, and
wherein the interface circuit is configured to determine that the first differential signals form an out of band (OOB) signal if the difference between the first differential signals is more than a second voltage, the second voltage being higher than the first voltage.

16. The storage device of claim 15, wherein the interface circuit is configured to extract a command from the first differential signals if the first differential signals form the common mode signal.

17. The storage device of claim 12, wherein the interface circuit is configured to exit the third sleep mode in response to a deactivation of the deep sleep signal if the interface circuit is in the third sleep mode.

18. The storage device of claim 17, wherein the interface circuit is configured to enter the first sleep mode or the second sleep mode if the interface circuit exits the third sleep mode.

19. The storage device of claim 17, wherein the interface circuit is configured to enter an active mode in response to an out of band (OOB) signal received as the first differential signals after the interface circuit exits the third sleep mode.

20. The storage device of claim 12, wherein the interface circuit further comprises:
a squelch circuit configured to receive the first differential signals and determine whether the first differential signals form one of a common mode signal and an out of band (OOB) signal;
an OOB signal detector configured to receive the first differential signals and decode the first differential signals if the first differential signals form the OOB signal; and
a receiving circuit configured to receive the deep sleep signal and determine whether the deep sleep signal is activated or deactivated.

21. The storage device of claim 20, wherein the interface circuit is configured to supply power to at least the squelch circuit, the OOB signal detector and the receiving circuit in the first sleep mode, and the interface circuit is configured to power down at least the receiver and the transmitter in the third sleep mode.

22. The storage device of claim 20, wherein the interface circuit is configured to supply power to at least the receiving circuit in the third sleep mode and the interface circuit is configured to power down at least the receiver, the transmitter, the squelch circuit, and the OOB signal detector in the third sleep mode.

23. The storage device of claim 22, wherein the interface circuit is configured to supply power to at least the squelch circuit and the OOB signal detector upon detection of a deactivation of the deep sleep signal in the third sleep mode.

24. The storage device of claim 23, wherein the interface circuit is configured to supply power to at least the receiver and the transmitter in response to the OOB signal after the interface circuit supplies power to at least the squelch circuit and the OOB signal detector.

25. The storage device of claim 12, wherein the first sleep mode is a partial state, and the second sleep mode is a slumber state.

26. The storage device of claim 25, wherein the second sleep mode is a partial sleep mode, and
the interface circuit takes more time to enter an active mode from the third sleep mode than the first sleep mode and the second sleep mode.

27. A method of managing a power of a Serial Advanced Technology Attachment (SATA) interface circuit, the method comprising:
receiving a request through the SATA interface circuit from a pair of signal lines, the request being a differential signal;
entering one of a first sleep mode and a second sleep mode of the SATA interface circuit in response to the request;
detecting an activation of a deep sleep signal; and
entering a third sleep mode of the SATA interface circuit upon detecting the activation of the deep sleep signal,
wherein a power consumed by the SATA interface circuit in the third sleep mode is less than a power consumed by the SATA interface circuit the second sleep mode,
the power consumed by the SATA interface circuit in the second sleep mode is less than a power consumed by the SATA interface circuit in the first sleep mode,
the SATA interface circuit is configured to enter the third sleep mode from the first sleep mode, and
the SATA interface circuit is configured to enter the third sleep mode from the second sleep mode.

28. The storage device of claim 12, wherein the interface circuit is configured to be connected to a deep sleep signal line which is separate from differential signal lines,
the interface circuit is configured to receive the deep sleep signal via the deep sleep signal line, and
the interface circuit is configured to receive the first differential signals via the differential signal lines.

29. The storage device of claim 28, wherein the interface circuit is configured to exit the third sleep mode in response to a deactivation of the deep sleep signal if the interface circuit is in the third sleep mode.

30. The storage device of claim 29, wherein the interface circuit is configured to enter the first sleep mode or the second sleep mode if the interface circuit exits the third sleep mode.

31. The storage device of claim 30, wherein the interface circuit is configured to enter an active mode in response to an out of band (OOB) signal received as the first differential signals after the interface circuit exits the third sleep mode.

32. A storage device comprising:
a nonvolatile memory; and
a memory controller configured to control the nonvolatile memory, the memory controller including,
an interface circuit configured to communicate with an external device, the interface circuit including a receiver configured to receive differential signals from the external device, wherein
the interface circuit is configured to enter one of a first sleep mode and a second sleep mode based on the differential signals,
the interface circuit is configured to receive a deep sleep signal from the external device, and to enter a third sleep mode, not via the second sleep mode, from the first sleep mode based on the deep sleep signal, the deep sleep signal not being received through the receiver,
the interface circuit is configured to consume less power in the third sleep mode than in the second sleep mode, and
the interface circuit is configured to consume less power in the second sleep mode than in the first sleep mode.

33. The SATA interface circuit of claim 1, wherein the SATA interface circuit is configured to enter the third sleep mode from the second sleep mode.

34. The SATA interface circuit of claim 33, wherein the SATA interface circuit is configured to enter the third sleep mode directly from the second sleep mode.

35. The SATA interface circuit of claim 33, wherein the SATA interface circuit is configured to enter the third sleep mode directly from the first sleep mode in response to the activation of the deep sleep signal.

36. The method of claim 9, wherein the SATA interface circuit is configured to enter the third sleep mode from the second sleep mode.

37. The storage device of claim 12, wherein the interface circuit is configured to enter the third sleep mode directly from the second sleep mode in response to the activation of the deep sleep signal.

38. The storage device of claim 12, wherein the interface circuit is configured to enter the third sleep mode directly from the first sleep mode in response to the activation of the deep sleep signal.

39. The storage device of claim 32, wherein the interface circuit is configured to enter the third sleep mode from the second sleep mode based on the deep sleep signal.

* * * * *